US012658490B2

(12) United States Patent
Kawasoe et al.

(10) Patent No.: US 12,658,490 B2
(45) Date of Patent: Jun. 16, 2026

(54) ENERGY STORAGE DEVICE

(71) Applicants: GS Yuasa International Ltd., Kyoto (JP); Blue Energy Co., Ltd., Kyoto (JP)

(72) Inventors: Yudai Kawasoe, Kyoto (JP); Yuta Ohsugi, Kyoto (JP); Taisei Sekiguchi, Kyoto (JP); Kazushi Nitta, Kyoto (JP)

(73) Assignees: GS Yuasa International Ltd., Kyoto (JP); Blue Energy Co., Ltd., Kyoto (JP)

( * ) Notice: Subject to any disclaimer, the term of this patent is extended or adjusted under 35 U.S.C. 154(b) by 511 days.

(21) Appl. No.: 18/277,932

(22) PCT Filed: Feb. 16, 2022

(86) PCT No.: PCT/JP2022/006232
§ 371 (c)(1),
(2) Date: Aug. 18, 2023

(87) PCT Pub. No.: WO2022/176925
PCT Pub. Date: Aug. 25, 2022

(65) Prior Publication Data
US 2024/0136610 A1    Apr. 25, 2024
US 2024/0234847 A9    Jul. 11, 2024

(30) Foreign Application Priority Data
Feb. 22, 2021    (JP) ................................. 2021-026816

(51) Int. Cl.
H01M 10/52      (2006.01)
H01M 4/133      (2010.01)
H01M 10/0587    (2010.01)
H01M 50/103     (2021.01)
(Continued)

(52) U.S. Cl.
CPC ....... *H01M 10/52* (2013.01); *H01M 10/0587* (2013.01); *H01M 50/103* (2021.01);
(Continued)

(58) Field of Classification Search
None
See application file for complete search history.

(56) References Cited

U.S. PATENT DOCUMENTS 6,143,449 A      11/2000  Kita et al.
2003/0175583 A1   9/2003  Suzuki
(Continued)

FOREIGN PATENT DOCUMENTS

JP      2003-157898 A    5/2003
JP         3425493 B2    7/2003
(Continued)

OTHER PUBLICATIONS

Kashiwagi et al (JP 2011028883 A), English Translation from FIT (Year: 2011).*
(Continued)

*Primary Examiner* — Colin W. Slifka
(74) *Attorney, Agent, or Firm* — RANKIN, HILL & CLARK LLP

(57) ABSTRACT

An energy storage device according to an aspect of the present invention includes: an electrode assembly in which a positive electrode and a negative electrode are stacked with a separator interposed therebetween; an electrolyte solution; and a sealable case for housing the electrode assembly and the electrolyte solution, in which a compressive modulus of elasticity of the separator is 15 MPa or more and an inside of the case is in a negative pressure state.

9 Claims, 2 Drawing Sheets

(51) Int. Cl.
  *H01M 50/136*   (2021.01)
  *H01M 50/489*   (2021.01)

(52) U.S. Cl.
  CPC ....... *H01M 50/136* (2021.01); *H01M 50/489*
     (2021.01); *H01M 4/133* (2013.01)

(56)       References Cited

U.S. PATENT DOCUMENTS

| | | |
|---|---|---|
| 2006/0003226 A1 | 1/2006 | Sawa et al. |
| 2013/0130079 A1 | 5/2013 | Kako et al. |
| 2022/0320568 A1 | 10/2022 | Uehira et al. |

FOREIGN PATENT DOCUMENTS

| | | |
|---|---|---|
| JP | 2005-346965 A | 12/2005 |
| JP | 2007-165125 A | 6/2007 |
| JP | 2008-97940 A | 4/2008 |
| JP | 2011-28883 A | 2/2011 |
| JP | 2011-187288 A | 9/2011 |
| JP | 2017-188465 A | 10/2017 |
| JP | 2019-21445 A | 2/2019 |
| JP | 6587105 B2 | 10/2019 |
| WO | 2002/091514 A1 | 11/2002 |
| WO | 2021/033697 A1 | 2/2021 |

OTHER PUBLICATIONS

English Translation of International Preliminary Report on Patentability from PCT/JP2022/006232 (Year: 2022).*
International Search Report (ISR) dated Apr. 19, 2022 filed in PCT/JP2022/006232.

* cited by examiner

ENERGY STORAGE DEVICE

TECHNICAL FIELD

The present disclosure relates to an energy storage device.

BACKGROUND ART

Nonaqueous electrolyte solution secondary batteries typified by lithium ion nonaqueous electrolyte solution secondary batteries are widely used in electronic equipment such as personal computers and communication terminals, motor vehicles, and the like since these secondary batteries have a high energy density. The nonaqueous electrolyte solution secondary battery generally includes an electrode assembly including a pair of electrodes electrically isolated by a separator, and a nonaqueous electrolyte solution interposed between the electrodes, and the battery is configured to perform charge-discharge by transfer of ions between both the electrodes. Capacitors such as lithium ion capacitors and electric double-layer capacitors are also widely in use as energy storage devices except for the nonaqueous electrolyte solution secondary batteries.

For the purpose of improving characteristics such as a capacity retention ratio of such an energy storage device, for example, many studies have been made on an additive of an electrolyte solution (see Patent Document 1).

PRIOR ART DOCUMENT

Patent Document

Patent Document 1: JP-A-2007-165125

SUMMARY OF THE INVENTION

Problems to be Solved by the Invention

However, depending on the additive of the electrolyte solution, the additive may be decomposed along with initial charge-discharge to generate a gas such as carbon monoxide. In addition, in a case where the electrolyte solution does not contain an additive as well, gas is generated by oxidation-reduction decomposition of the electrolyte solution in some cases. When gas is generated by decomposition of the additive or electrolyte solution, this gas is likely to accumulate in the gap between the electrodes. By the expansion and contraction of the electrodes due to charge-discharge, the gas existing inside the case flows into the gap between the electrodes and accumulates there in some cases. In a case where gas accumulation between the electrodes occurs, the active material of the electrode facing the place where gas is accumulated cannot be charged-discharged, and the performance of the energy storage device may deteriorate.

An object of the present invention is to provide an energy storage device in which the occurrence of gas accumulation between electrodes can be diminished.

Means for Solving the Problems

An energy storage device according to an aspect of the present invention includes: an electrode assembly in which a positive electrode and a negative electrode are stacked with a separator interposed therebetween; an electrolyte solution; and a sealable case for housing the electrode assembly and the electrolyte solution, in which a compressive modulus of elasticity of the separator is 15 MPa or more and an inside of the case is in a negative pressure state.

Advantages of the Invention

In the energy storage device according to an aspect of the present invention, the occurrence of gas accumulation between electrodes can be diminished.

MODE FOR CARRYING OUT THE INVENTION

Figure 1:
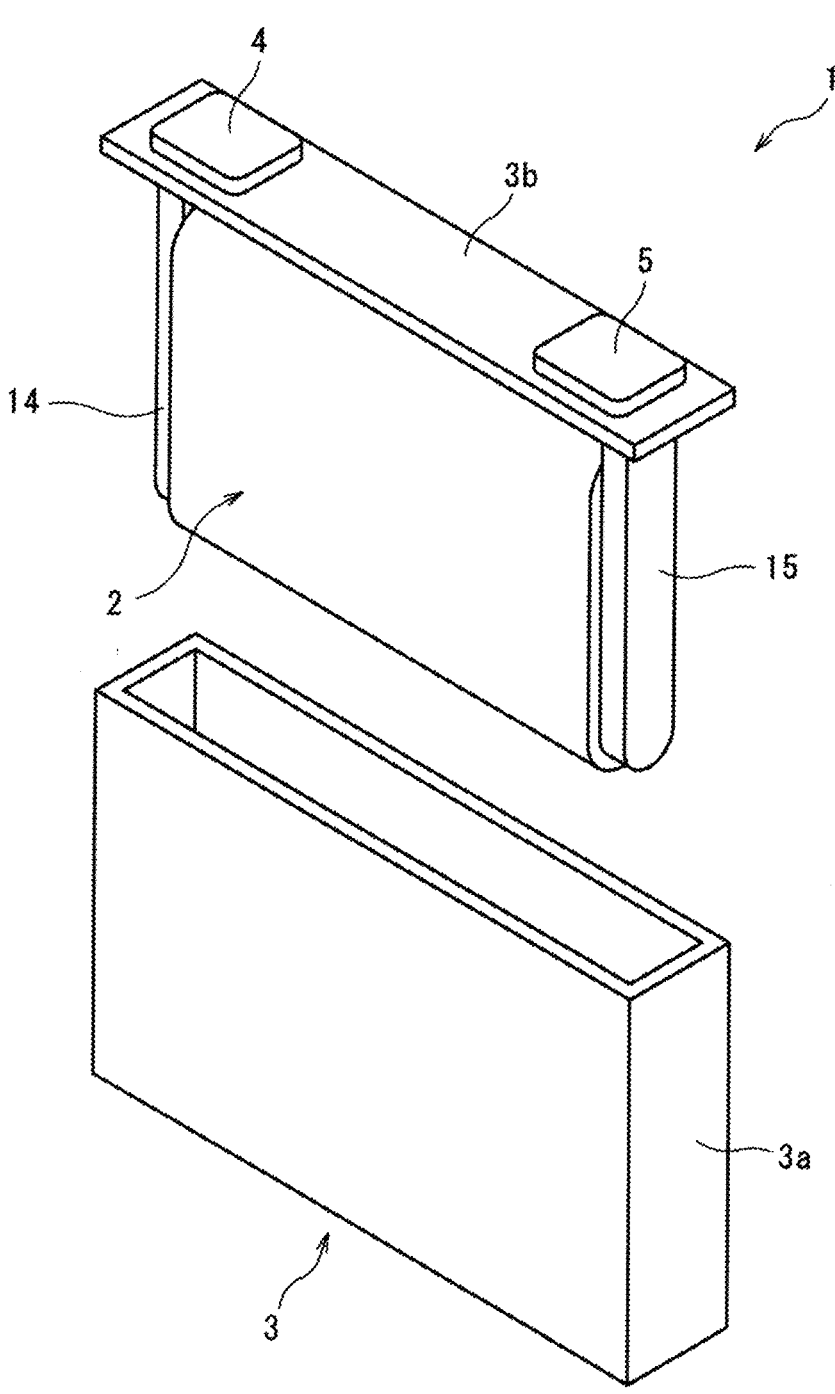
FIG. 1 is a schematic exploded perspective view illustrating an energy storage device according to an embodiment of the present invention.

First, the outline of an energy storage device disclosed in the present specification will be described.

An energy storage device according to an aspect of the present invention includes: an electrode assembly in which a positive electrode and a negative electrode are stacked with a separator interposed therebetween; an electrolyte solution; and a sealable case for housing the electrode assembly and the electrolyte solution, in which a compressive modulus of elasticity of the separator is 15 MPa or more and an inside of the case is in a negative pressure state.

As the energy storage device has the configuration, the occurrence of gas accumulation between the electrodes can be diminished. The reason for this is not clear, but for example, the following reasons are presumed. When the energy storage device is physically pressed from the outside in order to decrease the gap between the electrodes, the load applied to the electrode assembly changes greatly by the expansion and contraction of electrodes due to charge-discharge, and so a gap may be rather formed between the electrodes and gas accumulation between the electrodes may be likely to occur. On the other hand, when the inside of the case of the energy storage device is in a negative pressure state, force that pulls the case inward is generated, and the electrode assembly is pressed, thus the gas existing between the electrodes is released to the outside of the electrode assembly, and the occurrence of gas accumulation between the electrodes can be diminished. However, the present inventors have found out that in a case where the compressive modulus of elasticity of the separator is small, the separator is compressed when the electrode assembly is pressed, and the effect of decreasing the gap between the electrodes is diminished. In the energy storage device, as the inside of the case is in a negative pressure state and the compressive modulus of elasticity of the separator is 15 MPa or more, the gas existing between the electrodes can be effectively released to the outside of the electrode assembly and the occurrence of gas accumulation between the electrodes can be diminished. Furthermore, since the pressing on the electrode assembly caused by allowing the case to have a negative pressure is due to the atmospheric pressure, the change in the load applied to the electrode assembly is small and a gap between the electrodes is less likely to be formed. Consequently, it is considered that the occurrence of gas accumulation between the electrodes can be diminished in the energy storage device. Here, "the inside of the case is in a negative pressure state" means that the pressure of the internal surplus space of the case is lower than the external pressure of the case. The "internal surplus space of the case" means the space obtained by subtracting the portions occupied by the structures such as the electrode assembly, the electrolyte solution, and the current collector from the internal space of the case.

The method for bringing the inside of the case into a negative pressure state is not particularly limited. As the method for bringing the inside of the case into a negative pressure state, for example, a method in which sealing is performed in a state where the internal pressure of the case is reduced using a vacuum pump or the like, a method in which a member that adsorbs gas is housed inside the case, a method in which a gas soluble in the electrolyte solution is stored inside the case, and the like can be adopted. The methods for bringing the inside of the case into a negative pressure state can be used singly or in combination.

In the energy storage device, it is preferable that a gas soluble in the electrolyte solution is stored inside the case. In the energy storage device, as a gas soluble in the electrolyte solution is stored inside the sealed case, the gas dissolves in the electrolyte solution. As a result, the internal pressure of the case decreases, and the inside of the case can be brought into a negative pressure state more reliably. Since the pressing on the electrode assembly caused by filling a gas soluble in the electrolyte solution inside the case is due to the atmospheric pressure, the change in the load applied to the electrode assembly is small and a gap between the electrodes is less likely to be formed. The "gas soluble in the electrolyte solution" in the present invention refers to a gas having a solubility of 1 $cm^3$ or more in 1 $cm^3$ of the electrolyte solution at 25° C. under 1 atm.

The configuration of an energy storage device, the configuration of an energy storage apparatus, and a method for manufacturing the energy storage device according to an embodiment of the present invention, and other embodiments will be described in detail. The names of the respective constituent members (respective constituent elements) for use in the respective embodiments may be different from the names of the respective constituent members (respective elements) for use in the background art.

<Configuration of Energy Storage Device>

The energy storage device according to an embodiment of the present invention includes an electrode assembly in which a positive electrode and a negative electrode are stacked with a separator interposed therebetween, an electrolyte solution, and a sealable case for housing the electrode assembly and the electrolyte solution. The inside of the case is in a negative pressure state. In this embodiment, a gas soluble in the electrolyte solution is stored inside the case. The electrolyte solution is present in a state of being contained in the positive electrode, the negative electrode, and the separator. Hereinafter, a nonaqueous electrolyte solution secondary battery (hereinafter, also simply referred to as a "secondary battery") will be described as an example of the energy storage device with reference to the drawings. The dimensional relation (length, width, thickness, and the like) in each drawing does not reflect the actual dimensional relation.

Figure 2:
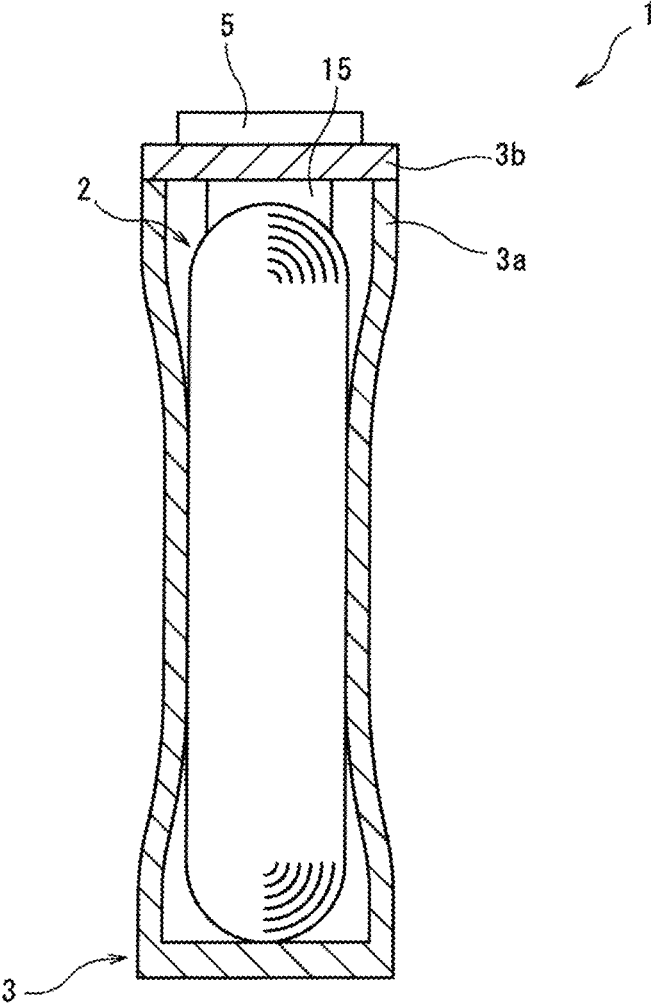
FIG. 2 is a schematic cross-sectional view of an energy storage device according to an embodiment of the present invention.

FIG. 1 illustrates an energy storage device 1 as an example of a prismatic battery. FIG. 2 is a schematic cross-sectional view of the energy storage device in FIG. 1. The energy storage device 1 includes a wound electrode assembly 2 in which a positive electrode and a negative electrode stacked with a separator interposed therebetween are wound; a positive current collector 14 and a negative current collector 15 respectively connected to both ends of the electrode assembly 2; a case 3 for housing these; and a positive electrode terminal 4 and a negative electrode terminal 5 provided in the case 3. As the case 3, a known metal case, resin case, and the like, which are commonly used as cases for nonaqueous electrolyte solution secondary batteries, can be used. Examples of the metal include aluminum, stainless steel, and nickel-plated steel. As illustrated in FIG. 2, it is preferable to use the case 3 formed of aluminum or an aluminum alloy from the viewpoint of being easily distorted by a negative pressure (and thus bringing the inside of the case into a negative pressure to press the electrode assembly more effectively). The case 3 according to the present embodiment is formed of aluminum or an alloy mainly composed of aluminum. The plate thickness of the case is not particularly limited, but may be approximately 0.2 mm to 2 mm (for example, 0.3 mm to 1.5 mm, typically 0.35 mm to 1 mm).

The case 3 includes a flat bottomed rectangular tube-shaped case body 3a and an elongated rectangular plate-like lid body 3b capable of closing an elongated rectangular opening of the case body 3a. The electrode assembly 2 is in direct or indirect contact with the inner surface of the case body 3a. In this embodiment, the case body 3a includes a pair of wide side surfaces facing each other with the electrode assembly 2 interposed therebetween, a pair of narrow side surfaces facing each other, and a bottom surface facing the lid body 3b. The electrode assembly 2 is in direct or indirect contact with the inner surfaces of the pair of wide side surfaces facing each other and the bottom surface of the case body 3a.

The lid body 3b is provided with the positive electrode terminal 4 and the negative electrode terminal 5 that conduct electricity to the outside. The positive electrode is electrically connected to the positive electrode terminal 4 via the positive current collector 14 connected to the positive substrate, and the negative electrode is electrically connected to the negative electrode terminal 5 via the negative current collector 15 connected to the negative substrate.

In the energy storage device 1, the inside of the case 3 is in a negative pressure state. As the inside of the case 3 is in a negative pressure state, that is, the force that pulls the case 3 inward is generated, the gas existing between the electrodes is released to the outside of the electrode assembly. Consequently, the occurrence of gas accumulation between the electrodes can be diminished in the energy storage device 1.

The internal pressure (absolute pressure) of the case 3 is not particularly limited as long as it is lower than the external pressure of the case 3 (typically atmospheric pressure=1 atmosphere=0.1013 MPa). The internal pressure of the case 3 is preferably 0.09 MPa or less, more preferably 0.085 MPa or less, still more preferably 0.075 MPa or less from the viewpoint of more favorably exerting the effect of diminishing the occurrence of gas accumulation between the electrodes. In some aspects, the pressure may be 0.07 MPa or less, or 0.065 MPa or less (for example, 0.055 MPa). The lower limit of the internal pressure of the case 3 is not particularly limited, but may be, for example, 0.02 MPa. The internal pressure of the case 3 may be 0.03 MPa or more or 0.04 MPa or more (for example, 0.045 MPa or more) from the viewpoint of resistance to negative pressure of the case. The technique disclosed here can be preferably implemented in an aspect in which the internal pressure of the case 3 is 0.02 MPa or more and 0.09 MPa or less (preferably 0.03 MPa or more and 0.07 MPa or less).

In this embodiment, a gas soluble in the electrolyte solution is stored inside the case 3. As a gas soluble in the electrolyte solution is stored inside the sealed case 3, the gas dissolves in the electrolyte solution, the internal pressure of the case 3 can be effectively reduced, and the inside of the case can be brought into a negative pressure state more reliably.

In a case where the electrolyte solution is a nonaqueous electrolyte solution, examples of a gas soluble in the non-aqueous electrolyte solution include carbon dioxide gas (solubility of 5 cm³ in 1 cm³ of nonaqueous electrolyte solution at 25° C. under 1 atm) and nitrous oxide gas. As the gas, carbon dioxide, which is easily handled and procured, is preferable. Since carbon dioxide easily dissolves in the nonaqueous electrolyte solution, the gas can quickly dissolve in the nonaqueous electrolyte solution even if a gas (gas containing carbon dioxide at high concentration) existing inside the case flows into and accumulates in the gap between the electrodes by the expansion and contraction of the electrodes due to charge-discharge, and as a result, carbon dioxide is preferable from the viewpoint of easily eliminating the gas accumulation as well.

In a case where carbon dioxide is used as a gas soluble in the nonaqueous electrolyte solution, the content (concentration) of carbon dioxide in the internal surplus space of the case is not particularly limited, but is preferably 2% by volume or more, more preferably 2.5% by volume or more, still more preferably 3% by volume or more from the viewpoint of bringing the inside of the case into a suitable negative pressure state, and the like. In some aspects, the content of carbon dioxide may be 4% by volume or more or 5% by volume or more (for example, 6% by volume or more, typically 7% by volume or more). The upper limit of the content of carbon dioxide is not particularly limited, but may be approximately 100% by volume (for example, 80% by volume). The content of carbon dioxide may be, for example, 50% by volume or less or 30% by volume or less (for example, 20% by volume or less, typically 15% by volume or less). After carbon dioxide dissolves in the electrolyte solution, by filling carbon dioxide inside the case so as to create an atmosphere having such a composition, the occurrence of gas accumulation between the electrodes can be diminished more favorably. In a case where carbon dioxide is used as a gas soluble in the nonaqueous electrolyte solution, the content (concentration) of carbon dioxide in the electrolyte solution inside the case is not particularly limited, but is preferably 0.001% by volume or more, more preferably 0.003% by volume or more from the viewpoint of bringing the inside of the case into a suitable negative pressure state, and the like. In some aspects, the content (concentration) of carbon dioxide in the electrolyte solution inside the case may be 0.0035% by volume or more or 0.005% by volume or more.

Meanwhile, in a case where the electrolyte solution is a nonaqueous electrolyte solution, examples of the gas that is hardly soluble or insoluble in the nonaqueous electrolyte solution include oxygen gas, nitrogen gas, and methane gas. In a preferable aspect, the content (concentration) of nitrogen in the internal surplus space of the case may be 50% by volume or less (for example, 45% by volume or less). In some aspects, the content (concentration) of nitrogen may be 40% by volume or less or 30% by volume or less. The lower limit of the nitrogen content is not particularly limited, but may be approximately 10% by volume. The nitrogen content may be, for example, 15% by volume or more or 20% by volume or more. After the gas soluble in the nonaqueous electrolyte solution dissolves in the electrolyte solution, by filling a gas soluble in the nonaqueous electrolyte solution inside the case so as to have such a nitrogen concentration, a negative pressure state suitable for diminishing the occurrence of gas accumulation between the electrodes can be achieved. In a preferable aspect, in a case where the total volume of gases (for example, carbon dioxide gas, methane gas, carbon monoxide gas, and hydrogen gas) other than nitrogen gas and oxygen gas in the internal surplus space of the case is 100% by volume, the proportion of carbon dioxide may be 4% by volume or more (for example, 4% by volume or more and 20% by volume or less). The proportion of carbon dioxide is preferably 6% by volume or more (for example, 6% by volume or more and 18% by volume or less), more preferably 8% by volume or more (for example, 8% by volume or more and 16% by volume or less). In some aspects, the proportion of carbon dioxide may be 10% by volume or more or 12% by volume or more. By filling carbon dioxide inside the case so as to have such a proportion of carbon dioxide, a negative pressure state suitable for diminishing the occurrence of gas accumulation between the electrodes can be achieved. The content (concentration) of each gas in the internal surplus space of the case can be measured by a gas chromatograph.

In the energy storage device, it is preferable that a member capable of adsorbing a gas soluble in the electrolyte solution is further housed in the case. As a member capable of adsorbing a gas soluble in the electrolyte solution is housed in the case, the content (concentration) of the gas soluble in the electrolyte solution in the internal surplus space of the case is likely to be lowered, and as the inside of the case is in a more suitable negative pressure state, the gas between the electrodes is more likely to be released to the outside of the electrode assembly. Therefore, it is possible to further improve the effect of diminishing the occurrence of gas accumulation between the electrodes. Since the gas soluble in the electrolyte solution is also adsorbed by the member capable of adsorbing the gas soluble in the electrolyte solution, it is possible to shorten the time until the inside of the case is in a negative pressure state after the case is sealed.

[Electrode Assembly]

The electrode assembly 2 may be a wound type in which a positive electrode and a negative electrode are wound in a state of being stacked with a separator interposed therebetween or a stacked type in which a plurality of positive electrodes and a plurality of negative electrodes are stacked with a separator interposed therebetween. In this embodiment, the electrode assembly 2 is a flat wound electrode assembly. In a wound electrode assembly, the effect acquired by applying this aspect can be exerted more effectively since the gas generated between the electrodes is less likely to be released to the outside of the electrode assembly compared to a stacked electrode assembly. In this embodiment, the electrode assembly 2 has two wound R portions and two flat portions. The two flat portions correspond to the flat parts on the outer wall side surfaces constructing the electrode assembly 2, and are each disposed to face the wide side surfaces of the inner wall side surfaces constructing the case body. In this Embodiment 1, the two flat portions are disposed so as to be in contact with the wide side surfaces of the case body. The two wound R portions correspond to the curved parts (bend parts) of the outer wall side surfaces constructing the electrode assembly 2, and are each disposed to face the bottom surface and lid body of the case body. The two wound R portions are disposed so as not to be in contact with the wide side surfaces of the case body. According to such a configuration, by bringing the inside of the case 3 into a negative pressure state, the force that pulls the case 3 inward is generated, at least one wide side surface of the case 3 is bent, and the flat portions (flat surfaces) of the flat electrode assembly 2 are pressed in the thickness direction (the direction of the short side of the rectangular plate-shaped lid body, and the direction in which the positive electrode, the negative electrode, and the separator are stacked). By pressing the flat portions (flat surfaces) of the electrode assembly 2 in the thickness direction in this way, it is possible to further diminish the occurrence of gas accumulation between the electrodes.

In a case where the electrode assembly 2 is a wound type, the electrode assembly 2 may further include a winding core at the central portion and may be wound around the winding core. The winding core may have either a hollow structure or a solid structure, but a winding core having a hollow structure is preferable. As the electrode assembly 2 including a winding core having a hollow structure, a gas soluble in the electrolyte solution is enclosed in a state where a hollow region is formed in the center of the electrode assembly 2, the internal pressure of the case 3 can be reduced more effectively.

(Positive Electrode)

The positive electrode has a positive substrate and a positive active material layer disposed directly on the positive substrate or over the positive substrate with an intermediate layer interposed therebetween.

The positive substrate has conductivity. Whether the positive substrate has "conductivity" or not is determined with the volume resistivity of $10^7$ $\Omega \cdot cm$ measured in accordance with JIS-H-0505 (1975) as a threshold. As the material of the positive substrate, a metal such as aluminum, titanium, tantalum, or stainless steel, or an alloy thereof is used. Among these metals and alloys, aluminum or an aluminum alloy is preferable from the viewpoints of electric potential resistance, high conductivity, and cost. Examples of the positive substrate include a foil, a deposited film, a mesh, and a porous material, and a foil is preferable from the viewpoint of cost. Accordingly, the positive substrate is preferably an aluminum foil or an aluminum alloy foil. Examples of the aluminum or aluminum alloy include A1085, A3003, A1N30, and the like specified in JIS-H-4000 (2014) or JIS-H-14160 (2006).

The average thickness of the positive substrate is preferably 3 μm or more and 50 μm or less, more preferably 5 μm or more and 40 μm or less, still more preferably 8 μm or more and 30 μm or less, particularly preferably 10 μm or more and 25 μm or less. When the average thickness of the positive substrate is within the above-described range, it is possible to enhance the energy density per volume of a secondary battery while increasing the strength of the positive substrate.

The intermediate layer is a layer arranged between the positive substrate and the positive active material layer. The intermediate layer includes a conductive agent such as carbon particles to decrease contact resistance between the positive substrate and the positive active material layer. The configuration of the intermediate layer is not particularly limited, and includes, for example, a binder and a conductive agent.

The positive active material layer includes a positive active material. The positive active material layer contains optional components such as a conductive agent, a binder (binding agent), a thickener, a filler, or the like if necessary.

The positive active material can be appropriately selected from known positive active materials. As the positive active material for lithium ion secondary battery, a material capable of storing and releasing lithium ions is usually used.

Examples of the positive active material include lithium-transition metal composite oxides that have an $\alpha$-NaFeO$_2$-type crystal structure, lithium-transition metal composite oxides that have a spinel-type crystal structure, polyanion compounds, chalcogenides, and sulfur. Examples of the lithium-transition metal composite oxides that have an $\alpha$-NaFeO$_2$-type crystal structure include $Li[Li_xNi_{(1-x)}]O_2$ ($0 \leq x < 0.5$), $Li[Li_xNi_yCo_{(1-x-y)}]O_2$ ($0 \leq x < 0.5$, $0 < y < 1$), $Li[Li_xCo_{(1-x)}]O_2$ ($0 \leq x < 0.5$), $Li[Li_xNi_yMn_{(1-x-y)}]O_2$ ($0 \leq x < 0.5$, $0 < y < 1$), $Li[Li_xNi_yMn_\beta Co_{(1-x-y-\beta)}]O_2$ ($0 \leq x < 0.5$, $0 < y$, $0 < \beta$, $0.5 < y + \beta < 1$), and $Li[Li_xNi_yCo_\beta Al_{(1-x-y-\beta)}]O_2$ ($0 \leq x < 0.5$, $0 < y$, $0 < \beta$, $0.5 < y + \beta < 1$). Examples of the lithium-transition metal composite oxides that have a spinel-type crystal structure include $Li_xMn_2O_4$ and $Li_xNi_yMn_{(2-y)}O_4$. Examples of the polyanion compounds include $LiFePO_4$, $LiMnPO_4$, $LiNiPO_4$, $LiCoPO_4$, $Li_3V_2(PO_4)_3$, $Li_2MnSiO_4$, and $Li_2CoPO_4F$. Examples of the chalcogenides include a titanium disulfide, a molybdenum disulfide, and a molybdenum dioxide. Some of atoms or polyanions in these materials may be substituted with atoms or anion species composed of other elements. The surfaces of these materials may be coated with other materials. In the positive active material layer, one of these materials may be used singly, or two or more thereof may be used in mixture.

In a preferable aspect, the positive active material is composed of a lithium-transition metal composite oxide having an $\alpha$-NaFeO$_2$-type crystal structure from the viewpoint of charge-discharge performance, energy density, and the like. For example, as the lithium-transition metal composite oxide, a nickel-containing lithium-transition metal composite oxide containing at least nickel (Ni) as a constituent element in addition to Li, a cobalt-containing lithium-transition metal composite oxide containing at least cobalt (Co) as a constituent element in addition to Li, and a manganese-containing lithium-transition metal composite oxide containing at least manganese (Mn) as a constituent element in addition to Li are exemplified. Among these, a nickel-containing lithium-transition metal composite oxide is preferable, and a lithium-transition metal composite oxide containing nickel, manganese and cobalt is more preferable.

The positive active material is usually particles (powder). The average particle size of the positive active material is preferably 0.1 μm or more and 20 μm or less, for example. By setting the average particle size of the positive active material to be equal to or more than the lower limit mentioned above, the positive active material is easily produced or handled. By setting the average particle size of the positive active material to be equal to or less than the upper limit mentioned above, the electron conductivity of the positive active material layer is improved. In the case of using a composite of the positive active material and another material, the average particle size of the composite is regarded as the average particle size of the positive active material. The term "average particle size" means a value at which a volume-based integrated distribution calculated in accordance with JIS-Z-8819-2 (2001) is 50% based on a particle size distribution measured by a laser diffraction/scattering method for a diluted solution obtained by diluting particles with a solvent in accordance with JIS-Z-8825 (2013).

A crusher, a classifier, and the like are used to obtain a powder having a predetermined particle size. Examples of the crushing method include a method of using a mortar, a ball mill, a sand mill, a vibratory ball mill, a planetary ball mill, a jet mill, a counter jet mill, a whirling airflow-type jet mill, a sieve, or the like. At the time of crushing, wet-type crushing in the coexistence of water or an organic solvent such as hexane can also be used. As the classification method, a sieve, a wind classifier, or the like is used both in dry manner and in wet manner, if necessary.

The content of the positive active material in the positive active material layer is preferably 50% by mass or more and 99% by mass or less, more preferably 70% by mass or more and 98% by mass or less, still more preferably 80% by mass or more and 95% by mass or less. By setting the content of the positive active material to the above range, it is possible to achieve both high energy density and productivity of the positive active material layer.

The conductive agent is not particularly limited as long as it is a material exhibiting conductivity. Examples of such a conductive agent include a carbonaceous material, a metal, and conductive ceramics. Examples of the carbonaceous material include graphite, non-graphitic carbon, and graphene-based carbon. Examples of the non-graphitic carbon include carbon nanofibers, pitch-based carbon fibers, and carbon black. Examples of the carbon black include furnace black, acetylene black, and ketjen black. Examples of the graphene-based carbon include graphene, carbon nanotubes (CNTs), and fullerene. Examples of the form of the conductive agent include a powdery form and a fibrous form. As the conductive agent, one of these materials may be used singly, or two or more thereof may be used in mixture. In addition, these materials may be used in combination. For example, a material carbon black combined with a CNT may be used. Among these materials, carbon black is preferable from the viewpoints of electron conductivity and coatability, and in particular, acetylene black is preferable.

The content of the conductive agent in the positive active material layer is preferably 1% by mass or more and 10% by mass or less, more preferably 3% by mass or more and 9% by mass or less. By setting the content of the conductive agent to the above range, the energy density of the secondary battery can be increased.

Examples of the binder include: thermoplastic resins such as fluororesin (polytetrafluoroethylene (PTFE), polyvinylidene fluoride (PVDF), etc.), polyethylene, polypropylene, polyacryl, and polyimide; elastomers such as an ethylene-propylene-diene rubber (EPDM), sulfonated EPDM, a styrene butadiene rubber (SBR), and a fluororubber; and polysaccharide polymers.

The content of the binder in the positive active material layer is preferably 1% by mass or more and 10% by mass or less, more preferably 3% by mass or more and 9% by mass or less. By setting the content of the binder to the above range, the active material can be stably held.

Examples of the thickener include polysaccharide polymers such as a carboxymethylcellulose (CMC) and a methylcellulose. In a case where the thickener has a functional group that is reactive with lithium and the like, the functional group may be deactivated by methylation or the like in advance.

The filler is not particularly limited. Examples of the filler include polyolefins such as polypropylene and polyethylene, inorganic oxides such as silicon dioxide, alumina, titanium dioxide, calcium oxide, strontium oxide, barium oxide, magnesium oxide and aluminosilicate, hydroxides such as magnesium hydroxide, calcium hydroxide and aluminum hydroxide, carbonates such as calcium carbonate, hardly soluble ionic crystals of calcium fluoride, barium fluoride, and barium sulfate, nitrides such as aluminum nitride and silicon nitride, and substances derived from mineral resources, such as talc, montmorillonite, boehmite, zeolite, apatite, kaolin, mullite, spinel, olivine, sericite, bentonite and mica, or artificial products thereof.

The positive active material layer may contain a typical nonmetal element such as B, N, P, F, Cl, Br, or I, a typical metal element such as Li, Na, Mg, Al, K, Ca, Zn, Ga, Ge, Sn, Sr, or Ba, and a transition metal element such as Sc, Ti, V, Cr, Mn, Fe, Co, Ni, Cu, Mo, Zr, Nb, or W as a component other than the positive active material, the conductive agent, the binder, the thickener, and the filler.

The mass per unit area of the positive active material layer (one surface) is not particularly limited, but may be, for example, 2.0 $mg/cm^2$ or more and 30.0 $mg/cm^2$ or less in terms of solid components. The mass per unit area of the positive active material layer is preferably 3.0 $mg/cm^2$ or more and 20.0 $mg/cm^2$ or less, more preferably 4.0 $mg/cm^2$ or more and 15.0 $mg/cm^2$ or less, still more preferably 5.0 $mg/cm^2$ or more and 10.0 $mg/cm^2$ or less.

(Negative Electrode)

The negative electrode has a negative substrate and a negative active material layer disposed directly on the negative substrate or over the negative substrate with an intermediate layer interposed therebetween. The configuration of the intermediate layer is not particularly limited, and for example, can be selected from the configurations exemplified for the positive electrode.

The negative substrate has conductivity. As the material of the negative substrate, a metal such as copper, nickel, stainless steel, nickel-plated steel, or aluminum, an alloy thereof, a carbonaceous material, or the like is used. Among these metals and alloys, the copper or copper alloy is preferable. Examples of the negative substrate include a foil, a deposited film, a mesh, and a porous material, and a foil is preferable from the viewpoint of cost. Accordingly, the negative substrate is preferably a copper foil or a copper alloy foil. Examples of the copper foil include a rolled copper foil and an electrolytic copper foil.

The average thickness of the negative substrate is preferably 2 μm or more and 35 μm or less, more preferably 3 μm or more and 30 μm or less, still more preferably 4 μm or more and 25 μm or less, particularly preferably 5 μm or more and 20 μm or less. By setting the average thickness of the negative substrate to the above range, it is possible to enhance the energy density per volume of a secondary battery while increasing the strength of the negative substrate.

The negative active material layer contains a negative active material. The negative active material layer contains optional components such as a conductive agent, a binder, a thickener, and a filler, if necessary. The optional components such as a conductive agent, a binder, a thickener, and a filler can be selected from the materials exemplified for the positive electrode.

The negative active material layer may contain a typical nonmetal element such as B, N, P, F, Cl, Br, or I, a typical metal element such as Li, Na, Mg, Al, K, Ca, Zn, Ga, Ge, Sn, Sr, or Ba, and a transition metal element such as Sc, Ti, V, Cr, Mn, Fe, Co, Ni, Cu, Mo, Zr, Ta, Hf, Nb, or W as a component other than the negative active material, the conductive agent, the binder, the thickener, and the filler.

The negative active material can be appropriately selected from known negative active materials. As the negative active material for lithium ion secondary battery, a material capable of storing and releasing lithium ions is usually used. Examples of the negative active material include metal Li; metals or metalloids such as Si and Sn; metal oxides or metalloid oxides such as Si oxide, Ti oxide, and Sn oxide; titanium-containing oxides such as $Li_4Ti_5O_{12}$, $LiTiO_2$, and $TiNb_2O_7$; a polyphosphoric acid compound; silicon carbide; and carbon materials such as graphite and non-graphitic carbon (graphitizable carbon or non-graphitizable carbon). Among these materials, graphite and non-graphitic carbon are preferable, and non-graphitic carbon (in particular non-graphitizable carbon) is more preferable. In the negative active material layer, one of these materials may be used singly, or two or more of these materials may be used in mixture.

The term "graphite" refers to a carbon material in which an average lattice spacing ($d_{002}$) of the (002) plane determined by an X-ray diffraction method before charge-discharge or in a discharge state is 0.33 nm or more and less than 0.34 nm. Examples of the graphite include natural graphite and artificial graphite. Artificial graphite is preferable from the viewpoint that a material having stable physical properties can be procured.

The term "non-graphitic carbon" refers to a carbon material in which the average lattice spacing ($d_{002}$) of the (002) plane determined by the X-ray diffraction method before charging/discharging or in the discharge state is 0.34 nm or more and 0.42 nm or less. Examples of the non-graphitic carbon include non-graphitizable carbon and graphitizable carbon. Examples of the non-graphitic carbon include a resin-derived material, a petroleum pitch or a material derived from petroleum pitch, a petroleum coke or a material derived from petroleum coke, a plant-derived material, and an alcohol-derived material.

In this regard, the "discharge state" means a state discharged so that lithium ions that can be stored and released in association with charge-discharge are sufficiently released from the carbon material as the negative active material. For example, the "discharge state" refers to a state where an open circuit voltage is 0.7 V or more in a unipolar battery in which a negative electrode containing a carbon material as a negative active material is used as a working electrode and metal Li is used as a counter electrode.

The "non-graphitizable carbon" refers to a carbon material in which the $d_{002}$ is 0.36 nm or more and 0.42 nm or less.

The "graphitizable carbon" refers to a carbon material in which the $d_{002}$ is 0.34 nm or more and less than 0.36 nm.

The negative active material is usually particles (powder). The average particle size of the negative active material can be, for example, 1 nm or more and 100 μm or less. In a case where the negative active material is a carbon material, a titanium-containing oxide, or a polyphosphoric acid compound, the average particle size thereof may be 1 μm or more and 100 μm or less. In a case where the negative active material is Si, Sn, an oxide of Si, an oxide of Sn, or the like, the average particle size thereof may be 1 nm or more and 1 μm or less. By setting the average particle size of the negative active material to be equal to or more than the lower limit, the negative active material is easily produced or handled. By setting the average particle size of the negative active material to be equal to or less than the above upper limit, the electron conductivity of the positive active material layer is improved. A crusher, a classifier, and the like are used to obtain a powder having a predetermined particle size. The crushing method and the powder classification method can be selected from, for example, the methods exemplified for the positive electrode. In a case where the negative active material is a metal such as metal Li, the negative active material may be in the form of a foil.

The content of the negative active material in the negative active material layer is preferably 60% by mass or more and 99% by mass or less, more preferably 90% by mass or more and 98% by mass or less. By setting the content of the negative active material to the above range, it is possible to achieve both high energy density and productivity of the negative active material layer.

The mass per unit area of the negative active material layer (one surface) is not particularly limited, but may be, for example, 0.5 mg/cm² or more and 20.0 mg/cm² or less in terms of solid components. The mass per unit area of the negative active material layer is preferably 0.8 mg/cm² or more and 15.0 mg/cm² or less, more preferably 1.0 mg/cm² or more and 10.0 mg/cm² or less, still more preferably 2.0 mg/cm² or more and 7.0 mg/cm² or less.

(Separator)

The lower limit of the compressive modulus of elasticity of the separator in the energy storage device of the present embodiment is 15 MPa, preferably 17 MPa, more preferably 19 MPa (for example, 20 MPa). As the compressive modulus of elasticity of the separator is equal to or more than the lower limit, compression of the separator during pressing is suppressed and the effect of diminishing the occurrence of gas accumulation between the electrodes can be improved. Meanwhile, the upper limit of the compressive modulus of elasticity of the separator is preferably 50 MPa, more preferably 40 MPa, still more preferably 30 MPa. As the compressive modulus of elasticity of the separator is equal to or less than the upper limit, the pressing force applied to the electrode assembly is less likely to be biased and the effect of diminishing the occurrence of gas accumulation between the electrodes can be improved. A separator having such a compressive modulus of elasticity is also suitable from the viewpoint of decreasing the resistance of the energy storage device. The compressive modulus of elasticity of the separator can be adjusted by changing the porosity and material, the stretching method, the molecular weight in the case of a polymer material, and the like.

The compressive modulus of elasticity of the separator is the compressive modulus of elasticity in the thickness direction and is calculated by the following equation from the amount of thickness change (μm) when the compressive stress reaches 1 MPa by applying a predetermined load to the separator in the thickness direction and the thickness (μm) of one sheet of separator before compression.

Compressive modulus of elasticity=1/{amount of thickness change per one sheet of separator (μm)/thickness of one sheet of separator before compression (μm)}

In a preferable aspect of the energy storage device disclosed herein, the relation between the compressive modulus of elasticity X (MPa) of the separator and the internal pressure P (absolute pressure: MPa) of the case satisfies 180≤(X/P)≤600. By appropriately setting the relation between the compressive modulus of elasticity X of the separator and the internal pressure P of the case, the effect of diminishing the occurrence of gas accumulation between the electrodes can be improved more favorably. For example, the technique disclosed herein can be preferably implemented, for example, in an aspect in which the relation between X and P is 200≤(X/P)≤580, more preferably 220≤(X/P)≤550, still more preferably 300≤(X/P)≤500, particularly preferably 350≤(X/P)≤450.

A separator having a proper compressive modulus of elasticity can be appropriately selected from among known separators and used. As the separator, for example, a separator composed of only a substrate layer, a separator in which a heat resistant layer containing heat resistant particles and a binder is formed on one surface or both surfaces of the substrate layer, or the like can be used. Examples of the form of the substrate layer of the separator include a woven fabric, a nonwoven fabric, and a porous resin film. Among these forms, a porous resin film is preferable from the viewpoint of strength. Examples of the material for the substrate layer of the separator include polyolefins such as polyethylene (PE) and polypropylene (PP), polyesters such as polyethylene terephthalate and polybutylene terephthalate, polyacrylonitrile, polyphenylene sulfide, polyimide, and fluororesin from the viewpoint of imparting a proper compressive modulus of elasticity to the separator. Among these, the polyolefins are preferable. Copolymers of monomers constituting these resins may also be used. In a preferable aspect, the substrate layer of the separator is formed of a polyethylene-based resin. As the polyethylene-based resin, a homopolymer of ethylene or a copolymer of ethylene is preferably used. As the copolymer of ethylene, a copolymer obtained by polymerizing an olefin copolymerizable with ethylene and a copolymer obtained by polymerizing at least one monomer copolymerizable with ethylene, which are resins containing a repeating unit derived from ethylene at 50% by mass or more, can be used. Examples of the olefin copolymerizable with ethylene include propylene. Examples of other monomers include conjugated dienes (for example, butadiene) and acrylic acid. As the substrate layer of the separator, a uniaxially stretched or biaxially stretched porous resin film can be suitably used. Among these, a porous resin film uniaxially stretched in the machine direction (MD direction) can be suitably used. Here, "uniaxial stretching" refers to stretching in only one direction (for example, machine direction) in the process of stretching a resin film at a temperature equal to or more than the glass transition temperature to orient the molecules, and "biaxial stretching" refers to stretching in two orthogonal directions (for example, the machine direction and the transverse direction). The transverse direction refers to a direction parallel to the conveying surface of the resin film and orthogonal to the machine direction. The means for forming pores in the process of fabricating a substrate layer of the separator is not particularly limited. For example, it is possible to use a dry substrate layer fabricated by adopting dry stretching in which stretching (for example, uniaxial stretching) is performed after drying, and a wet substrate layer fabricated by adopting wet stretching in which stretching (for example, biaxial stretching) is performed in a wet state (for example, a state where a resin as a raw material and a solvent are mixed). Among these, a dry substrate layer is preferable. The dry stretching of a microporous membrane can be performed by roll stretching or the like while performing heating. A dry-stretched substrate layer is particularly preferable since it is easy to adjust the compressive modulus of elasticity of the separator to the suitable value disclosed herein and thermal contraction in the transverse direction is little as well as the strength is proper. As the substrate layer of the separator, a material obtained by combining these resins may be used. For example, the structure of the substrate layer may be a single layer structure, a mixed structure (for example, a mixed structure of PP and PE), or a multilayer structure (for example, a three-layer structure of PP/PE/PP or a two-layer structure of PP/PE). Among these, a three-layer structure of PP/PE/PP is preferable.

The porosity of the substrate layer of the separator is not particularly limited, but the lower limit thereof is preferably 20% by volume, more preferably 30% by volume. In some aspects, the porosity of the separator may be, for example, 35% by volume or more, typically 40% by volume or more. Meanwhile, the upper limit of the porosity is preferably 80% by volume, more preferably 70% by volume. In some aspects, the porosity of the separator may be, for example, 65% by volume or less, typically 60% by volume or less (for example, 55% by volume or less). The porosity of the separator may be, for example, 50% by volume or less or 45% by volume or less. The "porosity" herein is a volume-based value, and means a value measured using a mercury porosimeter.

The heat resistant particles contained in the heat resistant layer preferably have a mass loss of 5% or less when the temperature is raised from room temperature to 500° C. in an air atmosphere at 1 atm, and more preferably have a mass loss of 5% or less when the temperature is raised from room temperature to 800° C. Examples of materials that have a mass loss equal to or less than a predetermined value include inorganic compounds. Examples of the inorganic compounds include oxides such as iron oxide, silicon oxide, aluminum oxide, titanium dioxide, zirconium oxide, calcium oxide, strontium oxide, barium oxide, magnesium oxide and aluminosilicate; nitrides such as aluminum nitride and silicon nitride; carbonates such as calcium carbonate; sulfates such as barium sulfate; hardly soluble ionic crystals such as calcium fluoride, barium fluoride, barium titanate; covalently bonded crystals such as silicon and diamond; and substances derived from mineral resources, such as talc, montmorillonite, boehmite, zeolite, apatite, kaolin, mullite, spinel, olivine, sericite, bentonite, and mica, and artificial products thereof. As the inorganic compounds, a simple substance or a complex of these substances may be used singly, or two or more thereof may be used in mixture. Among these inorganic compounds, silicon oxide, aluminum oxide, boehmite or aluminosilicate is preferable from the viewpoint of safety of the energy storage device.

The thickness of the separator (the total thickness of the substrate layer and heat resistant layer in the case of including a heat resistant layer) is not particularly limited, but the lower limit thereof is preferably 3 μm, more preferably 5 μm. In some aspects, the thickness of the separator may be, for example, 8 μm or more, typically 10 μm or more. Meanwhile, the upper limit of the thickness is preferably 30 μm, more preferably 25 μm. In some aspects, the thickness of the separator may be, for example, 20 μm or less, typically 15 μm or less (for example, 12 μm or less).

(Electrolyte Solution)

As the electrolyte solution, a nonaqueous electrolyte solution is used in a case where the energy storage device is a nonaqueous electrolyte solution secondary battery. The nonaqueous electrolyte solution can be appropriately selected from known nonaqueous electrolyte solutions. The nonaqueous electrolyte solution includes a nonaqueous solvent and an electrolyte salt dissolved in the nonaqueous solvent.

The nonaqueous solvent can be appropriately selected from known nonaqueous solvents. Examples of the nonaqueous solvent include cyclic carbonates, chain carbonates, carboxylic acid esters, phosphoric acid esters, sulfonic acid esters, ethers, amides, and nitriles. As the nonaqueous solvent, solvents in which some hydrogen atoms contained in these compounds are substituted with halogen may be used.

Examples of the cyclic carbonates include ethylene carbonate (EC), propylene carbonate (PC), butylene carbonate (BC), vinylene carbonate (VC), vinylethylene carbonate (VEC), chloroethylene carbonate, fluoroethylene carbonate (FEC), difluoroethylene carbonate (DFEC), styrene carbonate, 1-phenylvinylene carbonate, and 1,2-diphenylvinylene carbonate. Among these, EC and PC are preferable.

Examples of the chain carbonates include diethyl carbonate (DEC), dimethyl carbonate (DMC), ethyl methyl carbonate (EMC), diphenyl carbonate, trifluoroethyl methyl carbonate, and bis(trifluoroethyl)carbonate. Among these, DMC and EMC are preferable.

As the nonaqueous solvent, it is preferable to use the cyclic carbonate or the chain carbonate, and it is more preferable to use the cyclic carbonate and the chain carbonate in combination. By using the cyclic carbonate, dissociation of the electrolyte salt can be promoted to improve the ionic conductivity of the nonaqueous electrolyte solution. By using the chain carbonate, viscosity of the nonaqueous electrolyte solution can be kept low. In a case where a cyclic carbonate and a chain carbonate are used in combination, a volume ratio of the cyclic carbonate to the chain carbonate (cyclic carbonate:chain carbonate) is preferably in a range from 5:95 to 50:50, for example.

The electrolyte salt can be appropriately selected from known electrolyte salts. Examples of the electrolyte salt include a lithium salt, a sodium salt, a potassium salt, a magnesium salt, and an onium salt. Among these, a lithium salt is preferable.

Examples of the lithium salt include inorganic lithium salts such as $LiPF_6$, $LiPO_2F_2$, $LiBF_4$, $LiClO_4$, and $LiN(SO_2F)_2$, lithium oxalates such as lithium bis(oxalate)borate (LiBOB), lithium difluorooxalatoborate (LiFOB), and lithium bis(oxalate)difluorophosphate (LiFOP), and lithium salts having a halogenated hydrocarbon group, such as $LiSO_3CF_3$, $LiN(SO_2CF_3)_2$, $LiN(SO_2C_2F_5)_2$, $LiN(SO_2CF_3)(SO_2C_4F_9)$, $LiC(SO_2CF_3)_3$, and $LiC(SO_2C_2F_5)_3$. Among these, inorganic lithium salts are preferable, and $LiPF_6$ is more preferable.

The content of the electrolyte salt in the nonaqueous electrolyte solution is, at 20° C. under 1 atm, preferably 0.1 $mol/dm^3$ or more and 2.5 $mol/dm^3$ or less, more preferably 0.3 $mol/dm^3$ or more and 2.0 $mol/dm^3$ or less, still more preferably 0.5 $mol/dm^3$ or more and 1.7 $mol/dm^3$ or less, particularly preferably 0.7 $mol/dm^3$ or more and 1.5 $mol/dm^3$ or less. When the content of the electrolyte salt is in the above range, it is possible to increase the ionic conductivity of the nonaqueous electrolyte solution.

The nonaqueous electrolyte solution may contain an additive in addition to the nonaqueous solvent and the electrolyte salt. Examples of the additive include halogenated carbonic acid esters such as fluoroethylene carbonate (FEC) and difluoroethylene carbonate (DFEC); oxalic acid salts such as lithium bis(oxalate)borate (LiBOB), lithium difluorooxalatoborate (LiFOB), and lithium bis(oxalate)difluorophosphate (LiFOP); imide salts such as lithium bis(fluorosulfonyl)imide (LiFSI); aromatic compounds such as biphenyl, alkylbiphenyl, terphenyl, partly hydrogenated terphenyl, cyclohexylbenzene, t-butylbenzene, t-amylbenzene, diphenyl ether, and dibenzofuran; partial halides of the aromatic compounds mentioned above, such as 2-fluorobiphenyl, o-cyclohexylfluorobenzene, and p-cyclohexylfluorobenzene; halogenated anisole compounds such as 2,4-difluoroanisole, 2,5-difluoroanisole, 2,6-difluoroanisole, and 3,5-difluoroanisole; vinylene carbonate, methylvinylene carbonate, ethylvinylene carbonate, succinic anhydride, glutaric anhydride, maleic anhydride, citraconic anhydride, glutaconic anhydride, itaconic anhydride, cyclohexanedicarboxylic anhydride; ethylene sulfite, propylene sulfite, dimethyl sulfite, methyl methanesulfonate, busulfan, methyl toluenesulfonate, dimethyl sulfate, ethylene sulfate, sulfolane, dimethyl sulfone, diethyl sulfone, dimethylsulfoxide, diethylsulfoxide, tetramethylene sulfoxide, diphenyl sulfide, 4,4'-bis(2,2-dioxo-1,3,2-clioxathiolane, 4-methylsulfonyloxymethyl-2,2-dioxo-1,3,2-clioxathiolane, thioanisole, diphenyl disulfide, dipyriclinium disulfide, 1,3-propene sultone, 1,3-propane sultone, 1,4-butane sultone, 1,4-butene sultone, perfluorooctane, tristrimethylsilyl borate, tristrimethylsilyl phosphate, tetrakistrimethylsilyl titanate, lithium monofluorophosphate, and lithium difluorophosphate. One of these additives may be used singly, or two or more thereof may be used in mixture.

The content of the additive contained in the nonaqueous electrolyte solution is preferably 0.01% by mass or more and 10% by mass or less, more preferably 0.1% by mass or more and 7% by mass or less, still more preferably 0.2% by mass or more and 5% by mass or less, particularly preferably 0.3% by mass or more and 3% by mass or less with respect to the mass of the entire nonaqueous electrolyte solution. By setting the content of the additive to the above range, it is possible to improve the capacity retention performance or cycle performance after high-temperature storage, or to further improve the safety.

<Configuration of Energy Storage Apparatus>

The shape of the energy storage device of the present embodiment is not particularly limited, but for example, a flat prismatic battery is preferable. As the shape of the energy storage device is a flat prismatic battery, the force that pulls the case inward is generated in a case where the inside of the case is in a negative pressure state, and at least one side surface of the case body is easily recessed. The side surface of the electrode assembly facing the side surface of the case body recessed by the negative pressure is pressurized in the thickness direction, so that the gas between the electrodes is likely to be released to the outside of the electrode assembly and the effect of diminishing the occurrence of gas accumulation between the electrodes can be improved.

<Method for Manufacturing Energy Storage Device>

The method for manufacturing the energy storage device of the present embodiment includes, for example, housing an electrode assembly in which a negative electrode and a positive electrode are stacked in a case (hereinafter also referred to as an electrode assembly housing step), housing an electrolyte solution in the case (hereinafter also referred to as an electrolyte solution housing step), bringing the inside of the case into a negative pressure state (hereinafter also referred to as a negative pressure forming step), and sealing the case (hereinafter also referred to as a sealing step). In this embodiment, the negative pressure forming step includes filling a gas soluble in the electrolyte solution in the case (hereinafter also referred to as a gas filling step) after the electrolyte solution housing step and before the sealing step. As other steps, the method for manufacturing an energy storage device may include, for example, forming a positive electrode (hereinafter, also referred to as a positive electrode forming step), forming a negative electrode (hereinafter, also referred to as a negative electrode forming step), and forming an electrode assembly (hereinafter, also referred to as an electrode assembly forming step).

(Positive Electrode Forming Step)

In the positive electrode forming step, a positive electrode including a positive substrate and a positive active material layer is formed. In the positive electrode forming step, a positive composite containing a positive active material can be applied to the positive substrate to dispose the positive composite along at least one surface of the positive substrate. Specifically, for example, the positive composite is applied to the positive substrate, and dried to dispose the positive active material layer.

The positive composite may be a positive composite paste in a state of further containing a dispersion medium in addition to the optional components described above. As the dispersion medium, it is possible to use, for example, an aqueous solvent such as water or a mixed solvent mainly composed of water or an organic solvent such as N-methylpyrrolidone (NMP) or toluene. The positive active material layer may be stacked on the positive substrate directly or with an intermediate layer interposed therebetween.

(Negative Electrode Forming Step)

In the negative electrode forming step, a negative electrode including a negative substrate and a negative active material layer is formed. In the negative electrode forming step, a negative composite containing a negative active material can be applied to the negative substrate to dispose the negative composite along at least one surface of the negative substrate. Specifically, for example, a negative composite is applied to the negative substrate, and dried to dispose the negative active material layer. The negative composite may be a negative composite paste in a state of further containing a dispersion medium in addition to the optional components described above. The dispersion medium can be arbitrarily selected from those exemplified in the positive electrode forming step. The negative active material layer may be stacked on the negative substrate directly or with an intermediate layer interposed therebetween.

(Electrode Assembly Forming Step)

In the electrode assembly forming step, an electrode assembly is formed using the positive electrode and the negative electrode. The electrode assembly is preferably a flat wound electrode assembly having a pair of wound R portions facing each other and a flat portion located between the pair of wound R portions. In the step of forming an electrode assembly of the energy storage device, an electrode assembly is formed in which the positive electrode and the negative electrode are stacked or wound with the separator described above interposed therebetween so as to be alternately superposed one on the other.

(Electrode Assembly Housing Step)

In the electrode assembly housing step, the electrode assembly in which a negative electrode and a positive electrode are stacked is housed in a case.

(Electrolyte Solution Housing Step)

In the electrolyte solution housing step, the electrolyte solution is housed in the case. The electrolyte solution can be housed by a known method. In a case where the energy storage device is a nonaqueous electrolyte solution secondary battery, for example, a nonaqueous electrolyte solution is injected from an injection port provided in the case to house the electrolyte solution in the case.

(Gas Filling Step)

In the gas filling step, a gas soluble in the electrolyte solution is stored in the case after the electrolyte solution housing step. Specifically, after the electrolyte solution is housed in the case, a gas soluble in the electrolyte solution is injected into the case from the injection port to fill the gas soluble in the electrolyte solution in the case. The gas soluble in the electrolyte solution may be injected at atmospheric pressure or in a state where the internal pressure of the case is reduced using a vacuum pump or the like. Here, "reduced pressure" means that the pressure in the internal surplus space of the case is less than the atmospheric pressure. When the gas filling step is carried out in a pressurized state, the gas soluble in the electrolyte solution excessively dissolves in the electrolyte solution before sealing, thus it is difficult for the gas soluble in the electrolyte solution to further dissolve in the electrolyte solution after the sealing step, and the inside of the case may not be in a sufficiently negative pressure state. The injection port may be provided separately from the injection port for injecting the electrolyte solution.

As described above, in the energy storage device, the interior of the case is in a negative pressure state, and a suitable method for realizing such a negative pressure state includes filling a gas soluble in the electrolyte solution in the case after the electrolyte solution is housed in the case. As described above, by injecting a gas soluble in the electrolyte solution into the case in which the electrolyte solution is housed, the gas dissolves in the electrolyte solution after the sealing step, so that the internal pressure of the case may be effectively reduced and the inside of the case may be in a suitable negative pressure state. On the other hand, an aspect in which the electrolyte solution is housed in the case after a gas soluble in the electrolyte solution is stored in the case is not preferable since a large amount of the gas soluble in the electrolyte solution dissolves in the electrolyte solution at the time of electrolyte solution housing and the gas soluble in the electrolyte solution excessively dissolves (for example, dissolves to saturation) in the electrolyte solution before the sealing step. In other words, when a gas soluble in the electrolyte solution excessively dissolves in the electrolyte solution before the sealing step, it is difficult for the gas soluble in the electrolyte solution to further dissolve in the electrolyte solution after the sealing step, and it may not be possible to effectively reduce the internal pressure of the case. Preferably, the electrolyte solution is housed in the case, then preliminary charge is performed, and the internal pressure of the case is reduced using a vacuum pump or the like, and then a gas soluble in the electrolyte solution is injected so that the internal pressure of the case is near the atmospheric pressure. The internal pressure of the case immediately after the injection of a gas soluble in the electrolyte solution is an important factor from the viewpoint of bringing the inside of the case into a suitable negative pressure state after the sealing step. The internal pressure of the case immediately after the injection of a gas soluble in the electrolyte solution is preferably 0.1 MPa or more and 0.2 MPa or less, more preferably 0.1 MPa or more and 0.15 MPa or less, still more preferably 0.1 MPa or more and 0.12 MPa or less, particularly preferably 0.1 MPa or more and 0.11 MPa or less. By injecting a gas soluble in the electrolyte solution so that the internal pressure of the case immediately after the injection of a gas soluble in the electrolyte solution is near the atmospheric pressure in this manner, the disadvantage that the gas soluble in the electrolyte solution excessively dissolves in the electrolyte solution before the sealing step can be eliminated or alleviated, and the internal pressure of the case can be effectively reduced after the sealing step.

The amount of the gas soluble in the electrolyte solution stored is preferably 40% by volume or more, more preferably 70% by volume or more, and may be, for example, 95% by volume or more with respect to the volume of the internal surplus space of the case from the viewpoint of further reducing the internal pressure of the case. The amount of the gas soluble in the electrolyte solution stored may be 100% by volume with respect to the volume of the internal surplus space of the case. The technique disclosed herein can be preferably implemented in an aspect in which the amount of the gas soluble in the electrolyte solution stored is preferably 70% by volume or more and 100% by volume or less, more preferably 80% by volume or more and 95% by volume or less with respect to the volume of the internal surplus space of the case. Here, the "volume of the surplus space in the case" means a volume obtained by subtracting the volume of structures such as the electrode assembly, the electrolyte solution, and the current collectors from the internal volume of the case. The volume of the electrode assembly means the actual volume of constituent elements (active material, separator, and the like) of the electrode, and does not include voids present between the active materials and in the separator. In other words, the volume of the surplus space in the case means the volume of the gas stored inside the case when the internal pressure of the case is 1 atm (0.1013 MPa) at 25° C.

From the viewpoint of further reducing the internal pressure of the case, the content of the gas soluble in the electrolyte solution stored inside the case is preferably 80% by volume or more, preferably 98% by volume or more, still more preferably 100% by volume with respect to the amount of the total gases stored inside the case. The content of the gas soluble in the electrolyte solution may be 80% by volume or less with respect to the amount of the total gases stored inside the case from the viewpoint of easily handling the gas.

(Sealing Step)

In the sealing step, the case is sealed in a state where the gas soluble in the electrolyte solution is stored in the case. Specifically, the energy storage device can be obtained by sealing the injection port after the gas is stored in the case. The injection port is sealed by, for example, closing the injection port with a sealing member and fixing the sealing member by laser welding or the like.

The sealing step is required to be performed immediately after a gas soluble in the electrolyte solution is enclosed. In a case where the gas soluble in the electrolyte solution is left for a long time after being enclosed, the gas soluble in the electrolyte solution excessively dissolves in the electrolyte solution before the sealing step, thus it is difficult for the gas soluble in the electrolyte solution to further dissolve in the electrolyte solution after the sealing step, and the inside of the case may not be in a sufficiently negative pressure state. The elapsed time until sealing of the injection port after filling of the gas soluble in the electrolyte solution is preferably 1 hour or less from the viewpoint of decreasing the amount of the gas soluble in the electrolyte solution dissolved in the electrolyte solution before the sealing step or released to the outside of the case through the injection port by diffusion. The elapsed time is preferably 30 minutes or less (for example, 1 minute or more and 30 minutes or less), more preferably 20 minutes or less, still more preferably 15 minutes or less, particularly preferably 10 minutes or less (for example, 5 minutes or less). By shortening the elapsed time until sealing of the injection port after filling of the gas soluble in the electrolyte solution, the disadvantage that the gas soluble in the electrolyte solution excessively dissolves (typically, dissolves to saturation) in the electrolyte solution before the sealing step can be eliminated or alleviated, and the internal pressure of the case can be effectively reduced after the sealing step.

The method may include a step of temporarily sealing the injection port until the step of sealing the injection port after the gas soluble in the electrolyte solution is stored in the case. The step of temporarily sealing the injection port is, for example, a step of temporarily closing the injection port using a rubber plug member or the like. By including the step of temporarily sealing the injection port, it is possible to suppress release of the gas soluble in the electrolyte solution stored in the case due to diffusion to the outside of the case through the injection port. In this case, in the step of sealing the injection port, the injection port may be closed with a sealing member after the plug member or the like is removed, and the sealing member may be fixed by laser welding or the like. In the step of sealing the injection port, a sealing member that covers the injection port together with a plug member or the like that closes the injection port may be disposed, and the sealing member may be fixed by laser welding or the like.

The internal pressure of the case when the dissolution of the gas soluble in the electrolyte solution in the electrolyte solution is in an equilibrium state after the sealing step is preferably 0.02 MPa or more and 0.09 MPa or less at 25° C. from the viewpoint of effectively suppressing an increase in the distance between the electrodes. The internal pressure of the case immediately after sealing is preferably 0.1 MPa or more and 0.2 MPa or less. In other words, a large amount of the gas soluble in the electrolyte solution is not dissolved in the electrolyte solution immediately after the sealing step, and the internal pressure of the case can be reduced by dissolving the gas soluble in the electrolyte solution in the electrolyte solution after the sealing step.

The details of the electrode assembly, the electrolyte solution, the gas soluble in the electrolyte solution, the case, and the like in the method for manufacturing an energy storage device are as described above.

OTHER EMBODIMENTS

The energy storage device of the present invention is not limited to the embodiment described above, and various changes may be made without departing from the gist of the present invention. For example, the configuration according to one embodiment can be added to the configuration according to another embodiment, or a part of the configuration according to one embodiment can be replaced with the configuration according to another embodiment or a well-known technique. Furthermore, a part of the configuration according to one embodiment can be deleted. A well-known technique can be added to the configuration according to one embodiment. For example, in the embodiment described above, a case has been exemplified where the flat wound electrode assembly has two wound R portions and two flat portions, the two flat portions are disposed to face the wide side surfaces so as to be in direct or indirect contact with the wide side surfaces constructing the case body, and the two wound R portions are disposed to face the bottom surface and lid body constructing the case body so as not to be in contact with the wide side surfaces, but the present invention is not limited to this. The two wound R portions may be disposed to face the narrow side surfaces constructing the case body so as not to be in contact with the wide side surfaces. The effect acquired by applying this aspect can be exerted more effectively in a wound electrode assembly since gas accumulation is less likely to be released compared to a stacked electrode assembly.

For example, in the embodiment described above, as the method for bringing the inside of the case into a negative pressure state, a case of adopting a method in which a gas soluble in the electrolyte solution is stored inside the case has been exemplified, but the present invention is not limited to this. For example, as the method for bringing the inside of the case into a negative pressure state, a method in which sealing is performed in a state where the internal pressure of the case is reduced using a vacuum pump or the like may be adopted. In this case, the negative pressure forming step may include a pressure reducing step of reducing the internal pressure of the case using a vacuum pump or the like instead of the gas filling step. Such a pressure reducing step can be carried out after the electrolyte solution housing step and before the sealing step. However, it is preferable to adopt a method in which a gas soluble in the electrolyte solution is stored inside the case as in the embodiment described above from the viewpoint of easily eliminating gas accumulation caused as gas inside the case accumulates in the gap between the electrodes. In other words, since the concentration of the gas soluble in the electrolyte solution increases in the internal surplus space of the case, the gas can quickly dissolve in the electrolyte solution even if a gap is formed between the electrodes by the expansion and contraction of the electrodes due to charge-discharge and the gas existing inside the case flows into and accumulates in the gap between the electrodes, and as a result, it is preferable to adopt the method from the viewpoint of easily eliminating the gas accumulation.

In the embodiment, a case where the energy storage device is used as a nonaqueous electrolyte solution secondary battery (for example, lithium ion secondary battery) that can be charged and discharged has been described, but the type, shape, dimensions, capacity, and the like of the energy storage device are arbitrary. The present invention can also be applied to capacitors such as various secondary batteries, electric double-layer capacitors, or lithium ion capacitors.

The energy storage device of the present embodiment can be mounted as an energy storage unit (battery module) configured by assembling a plurality of energy storage devices 1 on a power source for motor vehicles such as electric vehicles (EV), hybrid vehicles (HEV), and plug-in hybrid vehicles (PHEV), a power source for electronic equipment such as personal computers and communication terminals, or a power source for power storage, or the like. In this case, the technique of the present invention may be applied to at least one energy storage device included in the energy storage unit.

Figure 3:
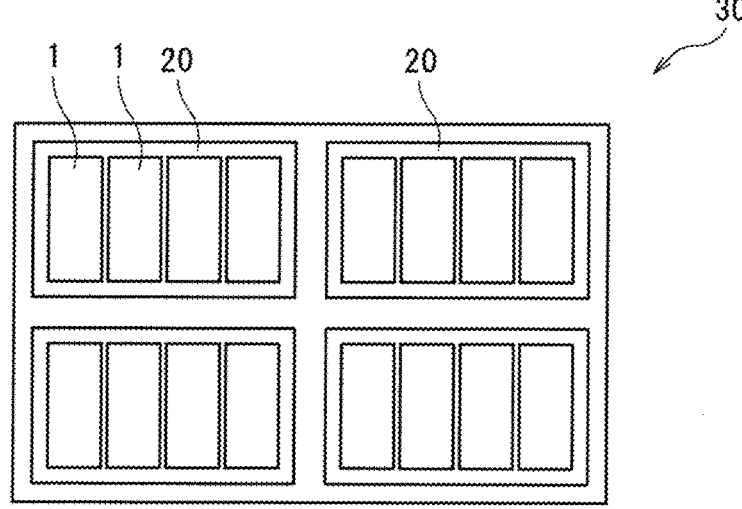
FIG. 3 is a schematic diagram illustrating an embodiment of an energy storage apparatus configured by assembling a plurality of energy storage devices.

FIG. 3 illustrates an example of an energy storage apparatus 30 formed by assembling energy storage units 20 in each of which two or more electrically connected energy storage devices 1 are assembled. The energy storage apparatus 30 may include a busbar (not illustrated) for electrically connecting two or more energy storage devices 1, a busbar (not illustrated) for electrically connecting two or more energy storage units 20, and the like. The energy storage unit 20 or the energy storage apparatus 30 may include a state monitor (not illustrated) for monitoring the state of one or more energy storage devices 1.

EXAMPLES

Hereinafter, the present invention will be described more specifically with reference to examples. The present invention is not limited to the following examples.

Examples 1 to 3 and Comparative Examples 1 to 3

(1) Positive Electrode Forming Step

A positive composite paste, containing $LiNi_{1/3}Co_{1/3}Mn_{1/3}O_2$ as the positive active material, PVDF as a binder, and acetylene black as a conductive agent and using NMP as a dispersion medium, was prepared. The ratio of the positive active material to the binder to the conductive agent was set to 90:5:5 as the mass ratio in terms of solid components. The positive composite paste was applied onto both surfaces of 12 μm-thick aluminum foil as a positive substrate and dried to form a positive active material layer, whereby positive electrodes of Examples 1 to 3 and Comparative Examples 1 to 3 were obtained. The amount of the positive composite (obtained by evaporating the dispersion medium from the positive composite paste) applied per unit area of one surface after drying was set to 8.5 $mg/cm^2$.

(2) Negative Electrode Forming Step

A negative composite paste containing non-graphitizable carbon as a negative active material and PVDF as a binder and using NMP as a dispersion medium was prepared. The ratio of the negative active material to the binder was set to 95:5 as the mass ratio of in terms of solid components. The negative composite paste was applied onto both surfaces of 8 μm-thick copper foil as a negative substrate and dried to form a negative active material layer, whereby negative electrodes of Examples 1 to 3 and Comparative Examples 1 to 3 were obtained. The amount of the negative composite (obtained by evaporating the dispersion medium from the negative composite paste) applied per unit area of one surface after drying was set to 4 $mg/cm^2$.

(3) Electrode Assembly Forming Step

The negative electrode, the positive electrode, and a 20 μm-thick separator having the compressive modulus of elasticity and porosity presented in Table 1 were wound around a winding core having a hollow structure in a state of being stacked, whereby wound electrode assemblies of Examples 1 to 3 and Comparative Examples 1 to 3 were fabricated. As the material for the separator, a dry porous resin film separator having a three-layer structure of PP/PE/PP was used in Examples 1 to 3 and Comparative Example 2, and a wet porous resin film separator having PE single layer was used in Comparative Examples 1 and 3.

(4) Electrode Assembly Housing Step

The electrode assembly was housed in a flat bottomed rectangular tube-shaped case body formed of an aluminum alloy.

(5) Electrolyte Solution Housing Step $LiPF_6$ was dissolved at a concentration of 1.2 $mol/dm^3$ in a nonaqueous solvent in which PC, DMC, and EMC were mixed at a volume ratio of 1:1:1 to prepare a nonaqueous electrolyte solution. In the energy storage devices of Examples 1 to 3 and Comparative Examples 1 to 3, 30 $cm^3$ of the prepared electrolyte solution was housed in the case. The volume of the internal surplus space of the case was 12 $cm^3$.

(6) Gas Filling Step

After the electrolyte solution was housed, preliminary charge was performed. Thereafter, in the energy storage devices of Examples 1 to 3 and Comparative Example 3, the internal pressure of the case was reduced to 10000 Pa using a vacuum pump, and then carbon dioxide gas as a gas soluble in the electrolyte solution and air were stored inside the case in the injection amounts presented in Table 1. In the energy storage devices of Comparative Examples 1 and 2, air was stored inside the case instead of carbon dioxide gas.

(7) Sealing Step

In 5 minutes after the carbon dioxide gas or the air was stored in the case, the injection port was sealed to seal the case, whereby energy storage devices of Examples 1 to 3 and Comparative Examples 1 to 3 as test cells were obtained.

[Evaluation]

(Internal Pressure of Case)

The internal pressure of the case was measured by attaching an internal pressure measuring instrument to the case. Table 1 presents the internal pressure (gauge pressure) of the case when 48 hours elapsed after sealing. The absolute internal pressure of the case was 0.0613 MPa in Examples 1 and 2 and Comparative Example 3, 0.0513 MPa in Example 3, and 0.1413 MPa in Comparative Examples 1 and 2.

(Compressive Modulus of Elasticity of Separator)

A cylindrical indenter having a diameter of 50 mm was pressed against a sample prepared by stacking 200 sheets of separator at 30° C. using a load cell type creep tester (manufactured by MYS-TESTER Company Limited), the stress state was maintained when the compressive stress reached 1 MPa, the amount of thickness change (μm) of the separator after 1 hour was measured, and the compressive modulus of elasticity (MPa) of the separator was calculated by the equation.

(Number of Occurrences of Gas Accumulation Between Electrodes)

The number of occurrences of gas accumulation between the electrodes in Examples and Comparative Examples was visually confirmed by disassembling the energy storage devices and unwinding the electrode assemblies.

4: Positive electrode terminal
14: Positive current collector
5: Negative electrode terminal
15: Negative current collector
3a: Case body
3b: Lid body
20: Energy storage unit
30: Energy storage apparatus

The invention claimed is:

1. An energy storage device comprising:
an electrode assembly in which a positive electrode and a negative electrode are stacked with a separator interposed therebetween;
an electrolyte solution; and
a sealable case for housing the electrode assembly and the electrolyte solution, wherein

TABLE 1

| | Gas injected | | Case | Separator | | Evaluation |
| | Kind | Amount of gas injected [cm³] | Internal pressure of case [MPa] | Compressive modulus of elasticity [MPa] | Porosity [%] | Number of occurrences of gas accumulation between electrodes |
|---|---|---|---|---|---|---|
| Comparative Example 1 | Air | 12 | 0.04 | 6 | 60 | 44 |
| Comparative Example 2 | Air | 12 | 0.04 | 15 | 50 | 45 |
| Comparative Example 3 | Carbon dioxide Air | 10 2 | −0.04 | 9 | 50 | 47 |
| Example 1 | Carbon dioxide Air | 10 2 | −0.04 | 15 | 50 | 7 |
| Example 2 | Carbon dioxide Air | 10 2 | −0.04 | 20 | 45 | 5 |
| Example 3 | Carbon dioxide Air | 11 1 | −0.05 | 20 | 45 | 2 |

As presented in Table 1, in Examples 1 to 3 in which the compressive modulus of elasticity of the separator was 15 MPa or more and the inside of the case was in a negative pressure state, the effect of diminishing the occurrence of gas accumulation between the electrodes was excellent. The effect of diminishing the occurrence of gas accumulation between the electrodes was improved as the compressive modulus of elasticity of the separator and the internal pressure of the case were lower. On the other hand, in Comparative Examples 1 and 3 in which the compressive modulus of elasticity of the separator was less than 15 MPa, the effect of diminishing the occurrence of gas accumulation between the electrodes was not acquired regardless of the internal pressure of the case. In Comparative Example 2 in which the inside of the case was not in a negative pressure state, the effect of diminishing the occurrence of gas accumulation between the electrodes was not acquired even though the compressive modulus of elasticity of the separator was 15 MPa or more.

As a result, it has been indicated that in the energy storage device, the occurrence of gas accumulation between the electrodes can be diminished as the compressive modulus of elasticity of the separator is 15 MPa or more and the inside of the case is in a negative pressure state.

DESCRIPTION OF REFERENCE SIGNS

1: Energy storage device
2: Electrode assembly
3: Case carbon dioxide is stored inside the case,
a compressive modulus of elasticity of the separator is 15 MPa or more, an inside of the case is in a negative pressure state, and
an internal pressure of the case is 0.07 MPa or less.

2. The energy storage device according to claim 1, wherein a content of carbon dioxide in an internal surplus space of the case is 5% by volume or more.

3. The energy storage device according to claim 1, wherein a compressive modulus of elasticity of the separator is 40 MPa or less.

4. The energy storage device according to claim 1, wherein the negative electrode contains a carbon material as a negative active material.

5. The energy storage device according to claim 1, wherein the electrode assembly is a wound electrode assembly in which the positive electrode and negative electrode stacked with the separator interposed therebetween are wound.

6. The energy storage device according to claim 1, wherein
the electrode assembly is a flat wound electrode assembly in which the positive electrode and negative electrode stacked with the separator interposed therebetween are wound,
the case includes a flat bottomed rectangular tube-shaped case body and a lid body that closes an opening of the case body, and
at least one side surface of the case body is recessed inward the case.

7. The energy storage device according to claim 6, wherein the case body includes a pair of wide side surfaces facing each other with the electrode assembly interposed therebetween, a pair of narrow side surfaces facing each other, and a bottom surface facing the lid body, the flat wound electrode assembly has two wound R portions and two flat portions, the two flat portions are disposed to face the wide side surfaces so as to be in direct or indirect contact with the wide side surfaces constructing the case body, and the two wound R portions are disposed to face the bottom surface and the lid body of the case body so as not to be in contact with the wide side surfaces.

8. The energy storage device according to claim 6, wherein the case body includes a pair of wide side surfaces facing each other with the electrode assembly interposed therebetween, a pair of narrow side surfaces facing each other, and a bottom surface facing the lid body, the flat wound electrode assembly has two wound R portions and two flat portions, the two flat portions are disposed to face the wide side surfaces so as to be in direct or indirect contact with the wide side surfaces constructing the case body, and the two wound R portions are disposed to face the narrow side surfaces constructing the case body so as not to be in contact the wide side surfaces.

9. The energy storage device according to claim 1, wherein by bringing the inside of the case into a negative pressure state, the force that pulls the case inward is generated, at least one side surface of the case is bent, and the electrode assembly is pressed in the thickness direction.

* * * * *